(12) United States Patent
Wilke

(10) Patent No.: US 12,734,873 B2
(45) Date of Patent: Sep. 15, 2026

(54) PROTECTION DEVICE FOR AN ELECTRICAL ENERGY STORAGE SYSTEM OF A VEHICLE

(71) Applicant: MAN Truck & Bus SE, Munich (DE)

(72) Inventor: Florian Wilke, Weissensberg (DE)

(73) Assignee: MAN Truck & Bus SE, Munich (DE)

( * ) Notice: Subject to any disclaimer, the term of this patent is extended or adjusted under 35 U.S.C. 154(b) by 246 days.

(21) Appl. No.: 18/727,525

(22) PCT Filed: Jan. 3, 2023

(86) PCT No.: PCT/EP2023/050037
§ 371 (c)(1),
(2) Date: Jul. 9, 2024

(87) PCT Pub. No.: WO2023/131593
PCT Pub. Date: Jul. 13, 2023

(65) Prior Publication Data
US 2025/0074177 A1 Mar. 6, 2025

(30) Foreign Application Priority Data
Jan. 10, 2022 (DE) ..................... 10 2022 100 343.4

(51) Int. Cl.
*B60K 1/04* (2019.01)
*B62D 21/15* (2006.01)

(52) U.S. Cl.
CPC .............. *B60K 1/04* (2013.01); *B62D 21/157* (2013.01); *B60Y 2306/01* (2013.01)

(58) Field of Classification Search
CPC ... B62D 21/157; B62D 25/20; B60Y 2306/01
See application file for complete search history.

(56) References Cited

U.S. PATENT DOCUMENTS 8,939,246 B2 * 1/2015 Yamaguchi ............. B60L 50/66 180/311
9,517,687 B2 * 12/2016 Nakajima ................ B60K 1/04
(Continued)

FOREIGN PATENT DOCUMENTS

DE 102015201881 A1 8/2016
WO WO 2020120068 A1 6/2020

OTHER PUBLICATIONS

International Search Report of PCT/EP2023/050037 mailed on May 2, 2023.
(Continued)

*Primary Examiner* — Huan Le
(74) *Attorney, Agent, or Firm* — WTA IP Law P.C.

(57) ABSTRACT

A mechanical protection device for components of an electrical energy storage system of a vehicle, comprising: a protective barrier for a battery of the energy storage system, for arrangement on the side of the battery situated towards the outside of the vehicle; and an installation frame for a charging connection unit, arranged separately from the battery, of the energy storage system, for arrangement in front of and at a distance in the vehicle longitudinal direction from an end of the protective barrier, wherein the installation frame has a contact face for arrangement in front of the end of the protective barrier, wherein the contact face comprises an outer-side, angled stop for engaging around the outside of the end of the protective barrier at a distance, wherein the contact face together with the outer-side stop comprises a region of the contact face with an L-shaped cross section; and vehicle frame support having the energy storage system mounted on it and the protection device; and vehicle having such a vehicle frame support.

10 Claims, 3 Drawing Sheets

(56) References Cited

U.S. PATENT DOCUMENTS

| | | | | |
|---|---|---|---|---|
| 11,370,287 | B2 * | 6/2022 | Tsuyuzaki ............ | B62D 21/157 |
| 2014/0246259 | A1 * | 9/2014 | Yamamura .......... | H01M 50/249 180/68.5 |
| 2018/0026248 | A1 | 1/2018 | Fehner | |
| 2019/0359265 | A1 | 11/2019 | Tsuyuzaki et al. | |
| 2022/0016966 | A1 | 1/2022 | Kecalevic et al. | |

OTHER PUBLICATIONS

Written opinion of International Searching Authority of PCT/EP2023/050037 mailed on May 2, 2023.

* cited by examiner

PROTECTION DEVICE FOR AN ELECTRICAL ENERGY STORAGE SYSTEM OF A VEHICLE

This application is a U.S. national phase application of International PCT application No. PCT/EP2023/050037, filed on Jan. 3, 2023, which claims priority to German patent application No. 10 2022 100 343.4, filed on Jan. 10, 2022, which are incorporated by reference herein in their entirety.

TECHNICAL BACKGROUND

The invention relates to a protection device for components of an electrical energy storage system of a vehicle, in particular for components of a high-voltage energy storage system.

SUMMARY OF THE INVENTION

In order to make the charging process of an electrical energy storage system of a utility vehicle intuitive and thus simplify it, in the case of a battery of a utility vehicle, a charging connection unit provided on the outside of the utility vehicle may be arranged adjacent to the battery, for example in an area on the utility vehicle where conventionally a tank filler neck is installed. The charging connection unit is connected to a charging contactor unit which is arranged on the vehicle interior side of the charging connection unit and, for example, electrically connects the charging connection to an electrical distributor via which the battery can then be charged. On the side of the battery facing the charging contactor unit, for example, a connection unit, also known as a battery junction box (BJB), may be arranged on the battery.

It is desired to prevent, if possible, a short circuit of the electrical energy storage system in the event of an accident, in particular a side impact. In particular in the case of a high-voltage energy storage system, this serves, on the one hand, to protect users or rescuers at an accident from contact so that they do not experience an electric shock by unintentionally touching a voltage-carrying vehicle component. However, this also serves to prevent a thermal event, such as a fire or an explosion. As a protective measure, in addition to an automatic shutdown of the energy storage system or an automatic shutdown of the energy supply via the electrical energy storage system, mechanical protection, in particular impact protection, is also desired.

It is an object of the invention to protect an electrical energy storage system and the charging unit of a vehicle as far as possible against the occurrence of a short circuit in the event of a side impact.

According to the invention, this object is achieved by a mechanical protection device for components of an electrical energy storage system of a vehicle, comprising:

- a protective barrier for a battery of the energy storage system, for arrangement on the vehicle exterior side of the battery, said protective barrier extending in the vehicle longitudinal direction and vertically along the battery,
- an installation frame for a charging connection unit of the energy storage system arranged separately from the battery, for arrangement, in the vehicle longitudinal direction, in front of an end of the protective barrier extending in the vertical direction, said installation frame being spaced from the end of the protective barrier,
- wherein the installation frame has a abutment surface for arrangement, in the vehicle longitudinal direction, in front of the end of the protective barrier and along the end of the protective barrier, wherein the abutment surface has an outside angled stop for enclosing the end of the protective barrier at a distance from the outside, wherein the abutment surface, together with the outer-side stop, comprises a region of the abutment surface with an L-shaped cross section.

A basic idea of the invention is to provide the abutment surface to catch and support the end of the protective barrier that is spaced apart from the installation frame when the installation frame and the protective barrier approach each other in the longitudinal direction of the vehicle as a result of an accident. In normal operation, the protective barrier is spaced apart from the installation frame. This serves to decouple the charging connection unit from the battery in terms of vibration. By catching the end of the protective barrier in the longitudinal direction of the vehicle during an approach, the installation frame, the charging connection unit and/or a charging contactor arranged behind the installation frame can be prevented from or limited in penetrating the installation space of the battery and/or a connection unit (battery junction box) arranged on the battery. For example, a mutual approach of the installation frame, the charging connection unit and/or the charging contactor on the one hand and the battery and/or the connection unit on the other can be limited and/or a collision can be prevented. The outer-side stop encloses the end of the protective barrier and prevents the end of the protective barrier from slipping outwards from the stop surface. The outer-side stop thus helps to catch the end of the protective barrier in the event of an accident wherein deformation forces also occur in the longitudinal direction of the vehicle, for example in the event of an oblique side impact on the installation frame. When the end of the protective barrier is caught, the installation frame is supported at the end of the protective barrier both in the vehicle longitudinal direction and in the vehicle transverse direction. The abutment surface with the outer-side stop thus forms a hooking area for catching the end of the protective barrier.

The protection device may in particular be an impact protection device. The described catching effect may also occur in the event of a solo accident. The mechanical protection device for components of an energy storage system of a vehicle may in particular be a protection device for components of a high-voltage energy storage system of a vehicle. The battery may also be referred to as an electrical energy storage device.

The installation frame is preferably an installation frame for holding the charging connection unit of the energy storage system, which is arranged separately from the battery.

The abutment surface may also be referred to as a catch surface. The abutment surface may be configured to limit a mutual approach of the end of the protective barrier and the abutment surface (in particular in the event of an impact or accident) in the vehicle longitudinal direction. The abutment surface is in particular configured to be arranged in front of the end of the protective barrier in a spaced manner. The outer-side stop is in particular configured to be arranged on the outer side of the end of the protective barrier and/or overlapping with an end portion of the protective barrier that encompasses the end. The outer-side stop may be configured to limit a mutual approach of the front end of the protective barrier and the stop in the vehicle transverse direction.

The abutment surface is preferably formed by a surface of a profile element extending in the vertical direction. The profile element is preferably rigidly and/or fixedly connected to the installation frame and/or formed integrally with the installation frame. The abutment surface may be referred to as a catch structure for the end of the protective barrier facing the installation frame. The abutment surface preferably comprises a base portion extending in the vehicle transverse direction and the outer-side stop extending transversely thereto in the vehicle longitudinal direction and optionally an inner-side stop extending transversely to the base portion.

Arranging the installation frame so as to be spaced from the end of the protective barrier means that the installation frame is arranged separately from the protective barrier and the end thereof and is arranged at a distance from the end of the protective barrier. Enclosing the end of the protective barrier on the outside at a distance by means of the outer-side stop of the abutment surface means that the outer-side stop is arranged separately from the protective barrier and from the end thereof and is arranged at a distance outside next to an end portion of the protective barrier, wherein the end portion comprises the end of the protective barrier. The abutment surface is preferably configured to receive the end of the protective barrier or at least a significant portion of the end in a space spanned by the abutment surface with the outer-side stop.

The mechanical protection device is preferably configured to be arranged on the energy storage system and/or on the vehicle in an installation configuration of the mechanical protection device. In an installation configuration of the protection device on the energy storage system and/or on the vehicle, the protective barrier is arranged on the side of the battery of the electrical energy storage system situated towards the outside of the vehicle and extends in the vehicle longitudinal direction and vertically along the battery. In the installation configuration, the installation frame is arranged, in the vehicle longitudinal direction, in front of the end of the protective barrier extending in the vertical direction and is arranged spaced apart from the end of the protective barrier. In the installation configuration, the abutment surface of the installation frame is arranged, in the vehicle longitudinal direction, in front of the end of the protective barrier and along the end of the protective barrier extending in the vertical direction, in particular spaced apart from the end of the protective barrier. In the installation configuration, the outer-side stop of the abutment surface encloses the end of the protective barrier at a distance. In the installation configuration, the end of the protective barrier preferably engages in the space spanned by the abutment surface with the outer-side stop and/or is arranged in it. In the installation configuration, the charging connection unit is preferably held on the installation frame. On the vehicle, the charging connection unit is arranged separately and spaced apart from the battery.

The abutment surface of the installation frame is preferably arranged on an edge of the installation frame (facing the end of the protective barrier in the installation configuration) and extends vertically. The region of the abutment surface with the L-shaped cross section preferably extends vertically. Preferably, in the installation configuration, the region of the abutment surface with the L-shaped cross section extends along a substantial portion of the height (i.e., the vertical length) of the end of the protective barrier. Preferably, the abutment surface and/or the region of the abutment surface with the L-shaped cross section extends along the end of the protective barrier.

The end of the protective barrier may be a front end or a rear end of the protective barrier. Here, the terms "front end" or "rear end" refer to the vehicle longitudinal direction.

The charging connection unit may comprise a charging connection for external energy supply for charging the electric battery (i.e., for external energy supply or for charging externally, i.e. from outside the vehicle).

The protective barrier is preferably made of metal, for example sheet steel. The protective barrier preferably comprises a corrugated or folded profile with outer profile areas extending in the vehicle longitudinal direction, inner profile regions extending in the vehicle longitudinal direction and profile regions connecting these. The protective barrier may thus be deformable while absorbing energy and maintaining cohesion. In the event of an accident, energy can be absorbed by deformation work. The profile may be referred to as a compressible structure. The protective barrier may comprise a plate-shaped part. The plate-shaped part may be or comprise the corrugated or folded profile. The plate-shaped part may also comprise a plate, in particular a plate arranged at the vehicle inner side of the profile.

In embodiments, the installation frame has an installation space for receiving the charging connection unit. The charging connection unit may be protected, for example, by an installation frame surrounding it.

In embodiments, the protective barrier has a projection configured to protrude, when the protective barrier is arranged on the side of the battery situated towards the outside of the vehicle, in a portion of the protective barrier that protrudes beyond the battery in front of the battery on the vehicle inner side. The projection may be configured to be supported on the battery in the vehicle longitudinal direction, for example in the event of a mutual approach of the projection and the energy storage device. By protruding in front of the battery on the vehicle inner side, the projection may prevent and/or limit inward bending of the protruding section of the protective barrier in the event of an accident.

The projection may form a stiffener and/or reinforcement of the protective barrier in the portion that protrudes beyond the battery. The projection may comprise at least one stiffening fin, wherein the stiffening fin protrudes on an inner side of the protective barrier. The projection may comprise a plate supported on a plurality of the stiffening fins. The stiffening fin may be triangular. In the aforementioned arrangement of the protective barrier, one side of the triangle may extend along one side of the battery. A gap may be formed between the projection and the side of the battery. The plate may be welded to the stiffening fins. The projection may be welded to a plate-shaped part of the protective barrier.

Preferably, the projection forms a reinforcement of the portion of the protective barrier that protrudes beyond the battery.

In embodiments, the abutment surface also has an inner-side angled stop for the end of the protective barrier.

When the end of the protective barrier is caught, the installation frame is supported on the end of the protective barrier both in the vehicle longitudinal direction and in the vehicle transverse direction. The abutment surface with the inner-side stop and the outer-side stop thus forms a hooking area for catching the end of the protective barrier.

The abutment surface, together with the inner-side stop and the outer-side stop, may comprise a region of the abutment surface that is U-shaped in cross-section. The legs of the region that is U-shaped in cross-section are formed by the inner-side and outer-side stops of the abutment surface.

The legs of the U may be of different lengths, corresponding to different lengths of the inner-side and outer-side stops in the vehicle longitudinal direction. In embodiments, the inner-side stop is shorter in the vehicle longitudinal direction than the outer-side stop.

Preferably, the inner-side stop and the outer-side stop extend side by side along the end of the protective barrier. Preferably, the inner-side and outer-side stops are arranged to enclose the end of the protective barrier on both sides. The abutment surface is preferably configured to receive the end of the protective barrier, or at least to receive a substantial portion of the end, in a space spanned by the abutment surface with the inner-side and outer-side stops. In the installation configuration, the inner-side and outer-side stops preferably enclose the end of the protective barrier on both sides. In other words, the end of the protective barrier is arranged in the space spanned by the inner-side and outer-side stops. In the event of an accident, there may be positive-fit contact between the abutment surface and the end of the protective barrier. Thereby, the end of the protective barrier can be caught and supported. However, contact only occurs in the event of a collision (crash load case). In normal operation, the contact is open, i.e. the protective barrier is spaced apart from the installation frame. This serves to decouple the charging connection unit from the battery in terms of vibration.

In the most preferred embodiments, the installation frame is made of die-cast metal. This ensures high stability in the event of an accident.

According to a further aspect of the invention, the object is achieved by an energy storage system for a vehicle, comprising a battery, a charging connection unit, a charging contactor unit, and a mechanical protection device according to one of the preceding claims,

- wherein the protective barrier is arranged on a side of the battery situated towards the outside of the vehicle and extends in the vehicle longitudinal direction and vertically along the battery,
- wherein the charging connection unit is mounted on the installation frame and the charging protection unit is configured to be arranged on the vehicle inner side with respect to the charging connection unit and spaced apart from the battery.

The energy storage system may in particular be a high-voltage energy storage system.

The charging contactor unit may, for example, be configured to be arranged on the installation frame and/or on the vehicle inner side with respect to the installation frame.

The protection device is in particular a protection device for the battery and the charging contactor unit.

The energy storage system preferably comprises a connection unit, a power switching unit and/or a control unit which is arranged on the battery and fastened to the battery. The charging contactor unit is configured to be arranged at a distance from the battery and the connection unit, the power switching unit and/or the control unit and on the vehicle inner side with respect to the charging connection unit. The connection unit, the power switching unit and/or the control unit may, for example, be mechanically fixed to the battery.

According to a further aspect of the invention, the object is achieved by a vehicle frame support having an energy storage system mounted on the vehicle frame support and having a mechanical protection device of the type described above,

- wherein the vehicle frame support comprises a frame longitudinal support and a holder or fender support which is fastened to the frame longitudinal support,
- wherein the energy storage system comprises a battery, a charging connection unit and a charging contactor unit,
- wherein the battery of the energy storage system is fastened to the frame longitudinal support, wherein the protective barrier of the mechanical protection device is arranged on a side of the battery situated towards the outside of the vehicle and extends in the vehicle longitudinal direction and vertically along the battery,
- wherein the charging contactor unit of the energy storage system and the installation frame of the mechanical protection device are fastened to the holder or fender support, wherein the charging connection unit is mounted on the installation frame, wherein the charging contactor unit is arranged on the vehicle inner side with respect to the charging connection unit,
- wherein the battery is arranged separately and spaced apart from the charging contactor unit, from the installation frame and from the charging connection unit, and
- wherein the abutment surface of the installation frame is arranged, in the vehicle longitudinal direction, spaced apart from the end of the protective barrier and along the end of the protective barrier extending in the vertical direction and the outer-side stop of the abutment surface encloses the end of the protective barrier at a distance.

The installation frame is thus attached to the frame longitudinal support via the holder or fender support and is in particular fastened to the frame longitudinal support separately from and spaced apart from the protective barrier.

For example, the charging contactor unit may be arranged on the in vehicle inner side with respect to the installation frame and/or may be mounted on the installation frame.

The energy storage system may in particular be the energy storage system described above, in particular a high-voltage energy storage system.

The mechanical protection device may be arranged on the vehicle frame support and/or the energy storage system, in particular in the installation configuration mentioned.

The battery is in particular arranged separately and spaced apart from the holder or fender support.

Preferably, a distance between the energy storage unit and the charging contactor unit is greater than a distance between the end of the protective barrier and the abutment surface of the installation frame.

The holder of the charging unit may be a fender support.

Preferably, the end of the protective barrier is arranged in a space spanned by the abutment surface of the installation frame with the outer-side stop.

In embodiments, the installation frame is fastened to the holder or fender support at least at a first support position of the installation frame. The installation frame may be fastened to the holder or fender support at a second support position of the installation frame via at least one diagonal support strut.

The support strut may also be referred to as a diagonal strut.

The support strut extends diagonally, i.e. diagonally to the vehicle longitudinal direction or diagonally to the longitudinal frame support.

According to a further aspect of the invention, the object is achieved by a vehicle having a vehicle frame support of the type described above.

The vehicle comprises the energy storage system mounted on the vehicle frame support and the mechanical protection device. The vehicle may in particular be a utility vehicle.

BRIEF DESCRIPTION OF THE DRAWINGS

The invention is described in detail below with reference to figures. In the figures.

DETAILED DESCRIPTION

In the following, unless otherwise stated, the same reference symbols are used for identical elements and elements with the same effect.

Figure 1:
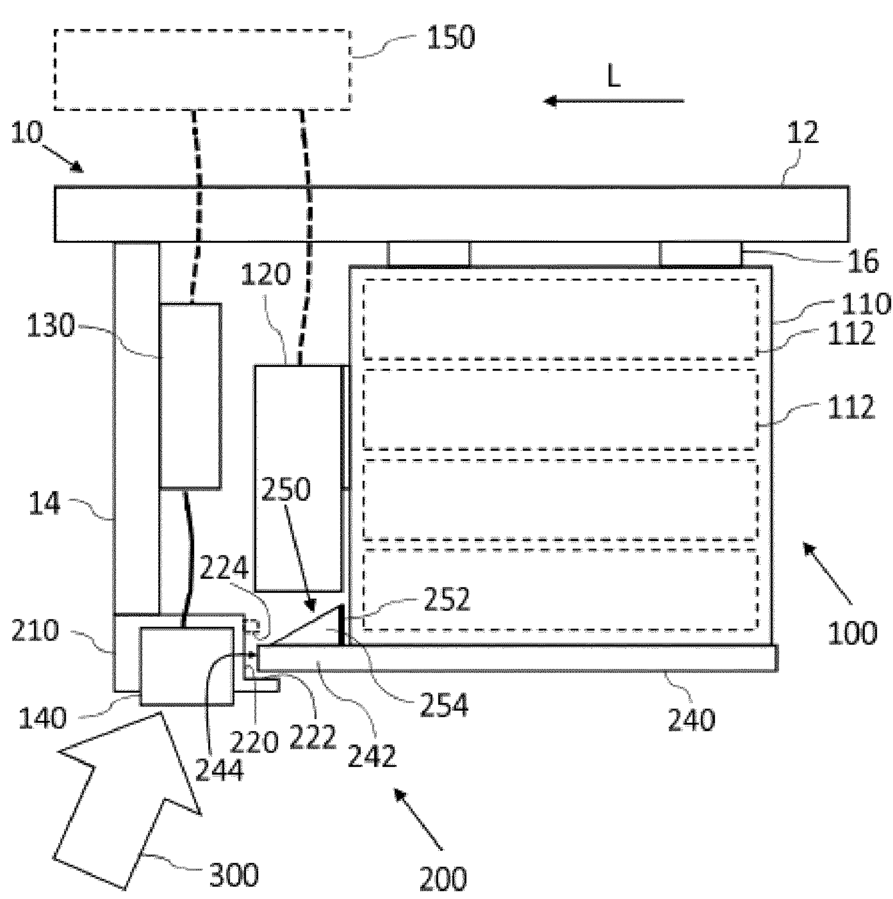
FIG. 1 is a schematic view of a vehicle frame support of a vehicle, comprising an energy storage system and a mechanical protection device according to embodiments of the present disclosure.

FIG. 1 shows a schematic view of a part of a vehicle with a partially shown vehicle frame support 10, an energy storage system 100 and a mechanical protection device 200 in a top view.

The vehicle frame support 10 comprises a frame longitudinal support 12 and a holder 14 fastened thereto in the form of a fender support. A portion of a left frame longitudinal support 12 is shown. The frame longitudinal support 12 may be part of a ladder frame of the vehicle frame support 10.

The energy storage system 100 comprises a battery 110, which for example comprises a plurality of battery modules 112. The energy storage system is, for example, a high-voltage energy storage system having a battery voltage in the range of 800 V.

The battery 110 is fastened to the frame longitudinal support 12 via frame-side holders 16. For example, the battery 110 is latched onto the holders 16.

A control unit 120, which is also referred to as a battery injunction box and also performs the function of a power switching unit and connection unit for the battery, is fastened to the battery 110. The individual battery modules 112 are connected directly to the control unit 120. The control unit 120 further comprises a high-voltage connection (plus and minus) and a control bus connection in the form of a CAN bus connection.

The energy storage system 100 further comprises a charging contactor unit 130 and a charging connection unit 140. The charging contactor unit 130 and the control unit 120 are connected, for example, via cables to a central HV distributor (high-voltage distributor) 150 of the energy storage system 100. The charging contactor unit 130 is connected to the charging connection unit 140 via a cable. The charging connection unit 140 comprises a charging socket for connecting an external charging plug in order to charge the battery 110. The charging contactor unit 130 is configured to connect the charging connection unit 140 to the central HV distributor 150 when an external charging plug is connected to the charging connection unit 140, i.e. plugged into the charging socket. In normal operation, i.e. without a charging plug connected, the charging connection unit 140 is separated from the high-voltage grid of the energy storage system 100 by the charging contactor unit 130.

The charging contactor unit 130 is fastened to the holder 14. The charging connection unit 140 is also fastened to the carrier 14 via an installation frame 210 of the protective device 200. The charging connection unit 140 and the charging protection unit 130 are thus connected to the frame longitudinal support 12 separately from the battery 110 and the control unit 120 only via the holder 14. They are thus mechanically decoupled. They are arranged at a distance from one another. As shown schematically in FIG. 1, the charging connection unit 140 is received in an installation space of the installation frame 210, wherein the installation frame 210 surrounds the installation space on several sides.

The protection device 200 further comprises a protective barrier 240 which is attached to the outer side of the vehicle longitudinal side of the battery 110 and extends essentially over the outer side of the battery 110 in the horizontal direction (in the vehicle longitudinal direction L) and in the vertical direction. In the example shown, the protective barrier 240 protrudes forward beyond the battery 110. In the protruding region 242, a triangular support structure in the form of a projection 250 is attached to the protective barrier 240 on the inner side. In normal operation, the projection 250 is separated from the front side of the battery 110 by a gap on one side of the triangular shape. FIG. 1 schematically shows the structure of the projection 250 with a vertical plate 252 and triangular stiffening fins 254 on which the plate 252 is supported. A plurality of stiffening fins 254 are arranged one above the other, each of which is connected to the plate 252.

A abutment surface 220 with an outer-side stop 222 is formed on the installation frame 210 in front of the front end 244 of the protective barrier 240. The main part of the abutment surface 220 is spaced apart from the front end 244 of the protective barrier 240 in the vehicle longitudinal direction L. The abutment surface 220 with the outer-side stop 222 is L-shaped in cross section and spans a space in which, as shown, the front end 244 of the protective barrier 240 is received. The abutment surface 220 and the front end 244 of the protective barrier 240 extend in the vertical direction over a significant portion of the height of the battery 110.

In the example shown, the abutment surface 220 also includes an inner-side stop 224, which is opposite the outers side stop 222 in the vehicle transverse direction, so that a positive-fit catch structure is formed for the front end 244 of the protective barrier 240, which is received therein at a distance during normal operation.

In the event of a side impact on the vehicle, wherein, for example, a force 300 shown as an arrow acts on the charging connection unit 140 and the installation frame 210, the deformation of the installation frame 210 may cause the installation frame 210 and the charging connection unit 140 to approach the battery 110 and the control unit 120. In this case, the abutment surface 220 approaches the protective barrier 240 and is finally caught on the protective barrier 240, with the front end 244 of the protective plate 240 engaging in the catch structure formed by the abutment surface 220 with the outer-side stop 222. The charging connection unit 140 can thus be prevented from penetrating the installation space of the control unit 120. This is further supported by the fact that the support structure formed by the projection 250 prevents or limits the bending of the front end portion 242 of the protective barrier 240 in the direction of the control unit 120.

Figure 2:
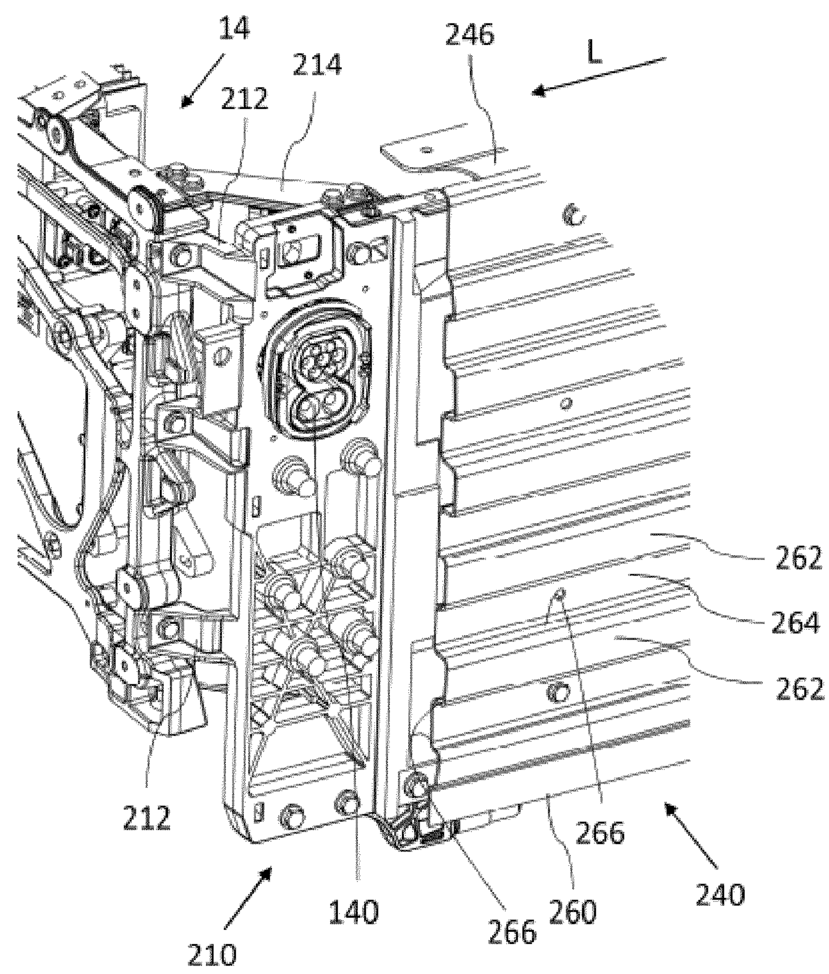
FIG. 2 is a schematic perspective view of an example of the mechanical protection device according to embodiments of the invention.

FIG. 2 shows a schematic perspective view of the installation frame 210 and the front part of the protective barrier 240. Shown is a plate-shaped stiffener 246 of the protective barrier 240 and a corrugated profile 260 of the protective barrier 240 attached to the outer side thereof including outer profile regions 262, inner profile regions 264 and profile regions 266 connecting them.

The installation frame 210 is made of die-cast metal and is attached to the holder 14 via struts 212. The struts 212 are molded or fastened to the installation frame 210 at first support positions. They extend substantially in the vehicle transverse direction towards the holder 14. The installation frame is additionally supported on the holder 14 via a diagonal support strut 214. The diagonal support strut 214 is fastened to the installation frame 210 at a second support position. On the installation frame 210, the first support positions and the second support position are spaced apart from one another in the vehicle longitudinal direction L, for example. This ensures dimensionally stable support of the installation frame 210 on the holder 14.

Figure 3:
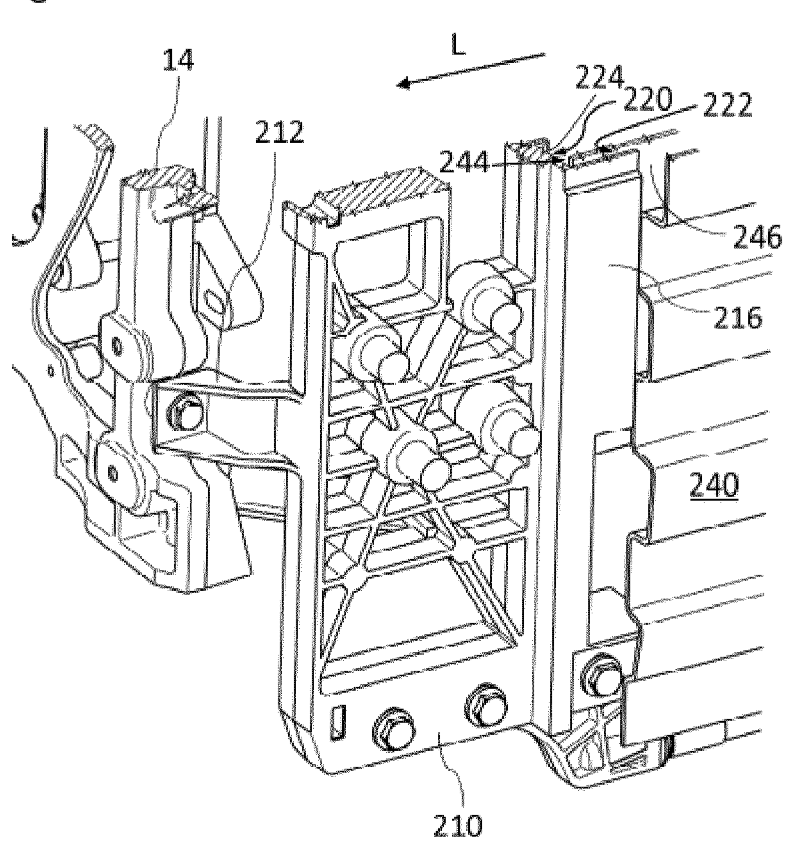
FIG. 3 is a schematic partial view of the mechanical protection device.

FIG. 3 shows a perspective and schematic sectional view of the position of the front end 244 of the protective barrier 240 in front of the abutment surface 220 of the installation frame 210. The front end 244 of the protective barrier 240 is formed here by the front end of the plate-shaped stiffener 246. On the side facing the protective barrier 240, a profile 216 is formed on one side and open at the ends, which forms the abutment surface 220 with the inner stop 224 and the outer stop 222.

Figure 4:
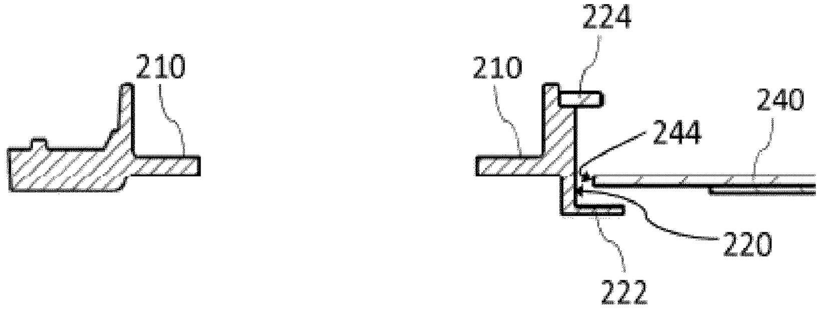
FIG. 4 is a schematic cross-sectional view of a part of a mechanical protection device according to embodiments of the invention.

FIG. 4 shows a cross section through the installation frame 210 in the area of the installation space for the charging connection unit 140 according to a further exemplary embodiment. Again, the front end 244 of the protective barrier 240 is arranged at a distance in the vehicle longitudinal direction in front of the abutment surface 220 of the installation frame in the space spanned by the outer-side stop 222 and the inner-side stop 224.

REFERENCE SYMBOLS

10 vehicle frame support
12 frame longitudinal support
14 holder
16 holder
100 energy storage system
110 battery
112 battery modules
120 control unit
130 charging contactor unit
140 charging connection unit
150 HV distributor
200 protection device
210 installation frame
212 struts
214 support strut
216 profile
220 abutment surface
222 outer-side stop
224 inner-side stop
240 protective barrier
242 end portion
244 front end
246 stiffener
250 projection
252 vertical plate
254 stiffening fins
260 corrugated profile
262 outer profile regions
264 inner profile regions
266 connecting profile regions
300 force

The invention claimed is:

1. A mechanical protection device for components of an electrical energy storage system of a vehicle, comprising:
a protective barrier for a battery of said energy storage system for arrangement on a side of said battery situated towards an outside of the vehicle and extending in a vehicle longitudinal direction and vertically along said battery, and
an installation frame for a charging connection unit of said energy storage system, arranged separately from said battery, for arrangement, in the vehicle longitudinal direction, in front of an end of said protective barrier extending in the vertical direction and spaced from the end of said protective barrier,
wherein said installation frame has an abutment surface for arrangement, in the vehicle longitudinal direction, in front of the end of said protective barrier and along the end of said protective barrier, wherein the abutment surface includes an outer-side angled stop for enclosing the end of said protective barrier at a distance on the outside, wherein the abutment surface together with the outer-side stop comprises a region of the abutment surface with an L-shaped cross section.

2. The protection device according to claim 1, wherein said installation frame has an installation space for receiving the charging connection unit.

3. The protection device according to claim 1, wherein said protective barrier comprises a projection configured to protrude, when said protective barrier is arranged on the side of said battery situated towards the outside of the vehicle, in a portion of said protective barrier that protrudes beyond said battery in front of said battery on a vehicle inner side.

4. The protection device according to claim 3, wherein the projection forms a reinforcement of the portion of said protective barrier that protrudes beyond said battery.

5. The protection device according to claim 1, wherein the abutment surface further comprises an inner-side angled stop for the end of said protective barrier.

6. The energy storage system for the vehicle, comprising the battery, the charging connection unit, a charging contactor unit, the mechanical protection device according to claim 1,
wherein said protective barrier is arranged on a side of the battery situated towards the outside of the vehicle and extends in the vehicle longitudinal direction and vertically along the battery,
wherein said charging connection unit is mounted on said installation frame and the charging contactor unit is configured to be arranged on a vehicle inner side with respect to the charging connection unit and at a distance from the battery.

7. A vehicle frame support with the energy storage system mounted on the vehicle frame support and with the mechanical protection device according to claim 1,
wherein said vehicle frame support comprises a frame longitudinal support and a holder or fender support fastened to said frame longitudinal support,
wherein said energy storage system comprises the battery, the charging connection unit and a charging contactor unit,
wherein said battery of the energy storage system is fastened to said frame longitudinal support, wherein said protective barrier of the mechanical protection device is arranged on a side of said battery situated towards the outside of the vehicle and extends in the vehicle longitudinal direction and vertically along the battery, wherein said charging contactor unit of the energy storage system and said installation frame of the mechanical protection device are fastened to the holder or fender support, wherein said charging connection unit is mounted on said installation frame, wherein said charging contactor unit is arranged on a vehicle inner side with respect to said charging connection unit, wherein said battery is arranged separately and at a distance from said charging contactor unit, from said installation frame and from said charging connection unit, and wherein the abutment surface of said installation frame is arranged, in the vehicle longitudinal direction, at a distance in front of the end of said protective barrier and along the end of the protective barrier extending in the vertical direction and the outer-side stop of the abutment surface encloses the end of said protective barrier at a distance.

8. The vehicle frame support according to claim 7, wherein the end of said protective barrier is arranged in a space spanned by the abutment surface of said installation frame with the outer-side stop.

9. The vehicle frame support according to claim 7, wherein said installation frame is fastened to the holder or fender support at least at a first support position of the installation frame and is fastened to the holder or fender support via at least one diagonal support strut at a second support position of the installation frame.

10. A vehicle comprising a vehicle frame support according to claim 7.

* * * * *